United States Patent [19]

Earwood, Sr.

[11] Patent Number: 4,679,234
[45] Date of Patent: Jul. 7, 1987

[54] TELEPHONE CORD TWIST RESTRAINER

[76] Inventor: Donald E. Earwood, Sr., 2219 NW. Troost, Roseburg, Oreg. 97470

[21] Appl. No.: 849,700

[22] Filed: Apr. 9, 1986

[51] Int. Cl.$^4$ .................. H04M 1/15; H04R 1/06; H01B 7/06
[52] U.S. Cl. .................................. 379/438; 174/69; 191/12 R
[58] Field of Search .............. 179/186, 184, 178, 154; 191/12 R, 12 S; 174/69; 379/438, 451

[56] References Cited

U.S. PATENT DOCUMENTS 1,708,165  4/1929  Willat ................................. 379/451
4,357,500  11/1982  Nilsen ................................. 179/184

*Primary Examiner*—Gene Z. Rubinson
*Assistant Examiner*—Danita R. Byrd
*Attorney, Agent, or Firm*—John F. Ingman

[57] ABSTRACT

A telephone cord twist restrainer which is comprised of a rudder-like plate which is attached to a coiled telephone cord by means of slotted holes formed in the plate and by two (2) projections extending from the plate which slidably fit, in opposing directions, within the coils of the telephone cord. The plate extends laterally on a single side beyond the diameter of the coils in lengthwise orientation with the coiled cord, where its extending mass provides stability to the coiled telephone cord both through physical contact at nearby surfaces, and by the location of weight of the plate itself outside of the periphery of the coiled telephone cord. Notches may be formed on the projections so as to provide improved retention within the coiled cord, especially when the coiled telephone cord is extended and stretched out close to its maximum limit.

7 Claims, 8 Drawing Figures

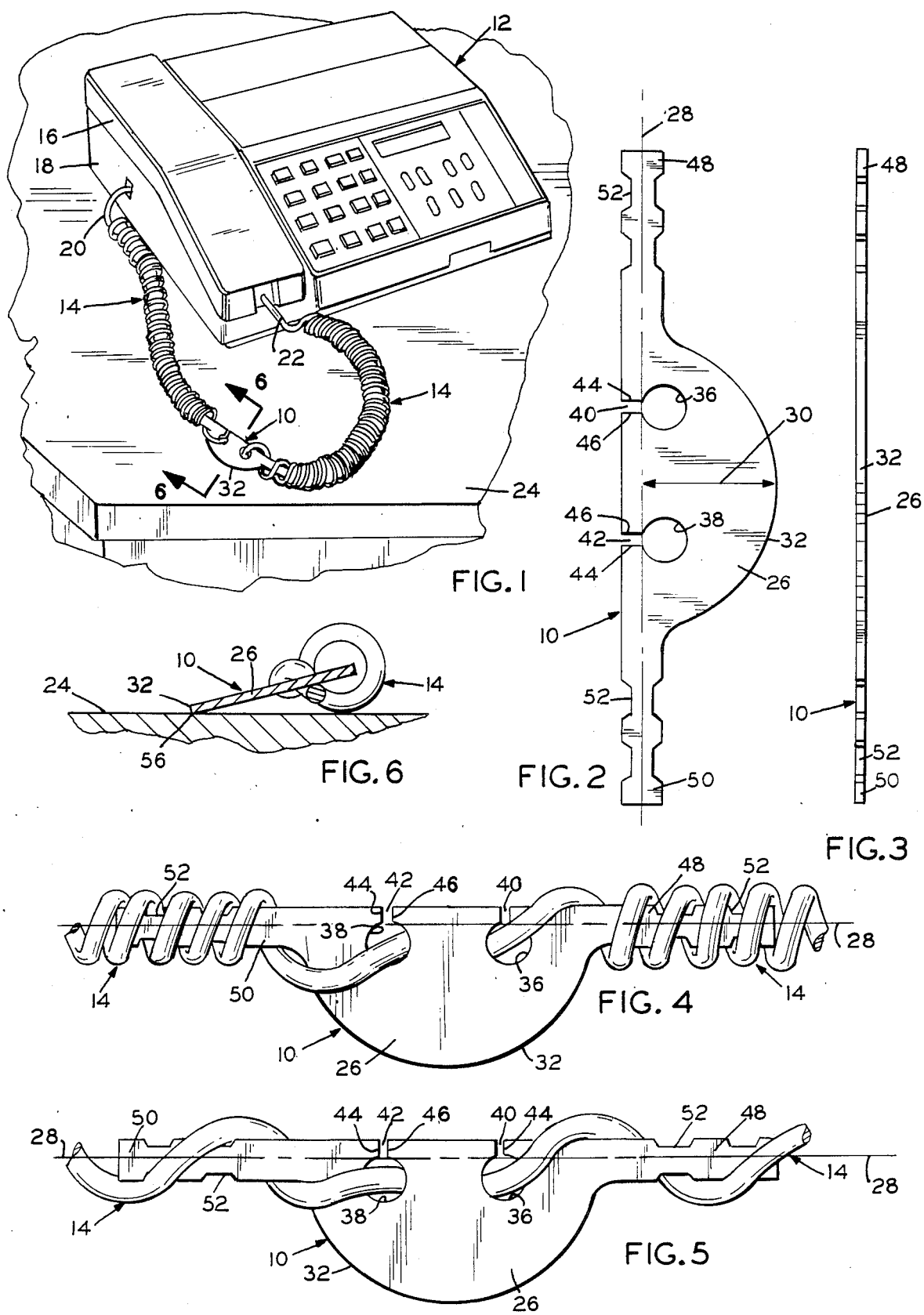

TELEPHONE CORD TWIST RESTRAINER

BACKGROUND OF THE INVENTION

1. Field of the Invention

The present invention involves a device which restrains the twisting of coiled telephone cords, and more particularly is concerned with a plate-like attachment which is connected to the coiled telephone cord to inhibit twisting.

2. Description of the Prior Art

A common problem exists with the normal coiled telephone cord which connects the handset to the telephone base, in that the coiled cored tends to twist during use so that eventually it kinks, preventing full use of the cord. A common way to unkink the telephone cord is to hold the cord at an intermediate point with the handset dangling and allowing the handset to rotate freely, thereby untwisting the cord. However such procedure may be annoying and time consuming. What is needed is a device, attachable to the coiled telephone cord, which will resist unwanted twisting of that cord so as to generally preclude kinking thereof. Such device should be simple and economical to produce and could have the added feature of providing space for emergency information and advertising thereon.

SUMMARY OF THE INVENTION

The present invention provides a telephone cord attachment which is designed to satisfy the aforementioned need. The invention embodies a plate-like device which is attached to and through the coils of the coiled telephone cord so as to resist twisting of the cord.

Accordingly, the present invention provides a telephone cord twist restrainer which is comprised of a rudder-like plate which, in its preferred embodiment, it is attached to the telephone cord by means of slotted holes formed in the plate and by two (2) projections extending from the plate which slidably fit, in opposing directions, within the coils of the telephone cord. The plate extends laterally on a single side beyond the diameter of the coils in lengthwise orientation with the the coiled cord, where its extending mass provides stability to the coiled telephone cord both through physical contact at nearby surfaces, such as a desk or table, and by the location of the weight of the plate itself outside the periphery of the coiled telephone cord. Notches may be formed on the projections which fit within the coiled cord so as to provide improved retention thereon, especially when the coiled telephone cord is extended and stretched out close to its maximum limit.

BRIEF DESCRIPTION OF THE DRAWINGS

FIG. 1 illustrates a perspective view of the telephone cord twist restrainer as attached to a coiled telephone cord between the telephone headset and telephone base.

FIG. 2 shows a side view of the telephone cord twist restrainer of FIG. 1, separate from the coiled telephone cord.

FIG. 3 shows an outside edge view of the telephone cord twist restrainer of FIG. 2.

FIG. 4 shows a side view of the telephone cord twist restrainer of FIG. 1 wherein the coiled telephone cord is in cord is in a normal relaxed state.

FIG. 5 shows a side view of the telephone cord twist restrainer of FIG. 1, wherein the coiled telephone cord is extended or stretched close to its maximum limit.

FIG. 6 illustrates a cross section of the telephone cord twist restrainer at line 6—6 of FIG. 1, showing stabilization against a nearby surface.

DESCRIPTION OF THE PREFERRED EMBODIMENT

Figure 7:
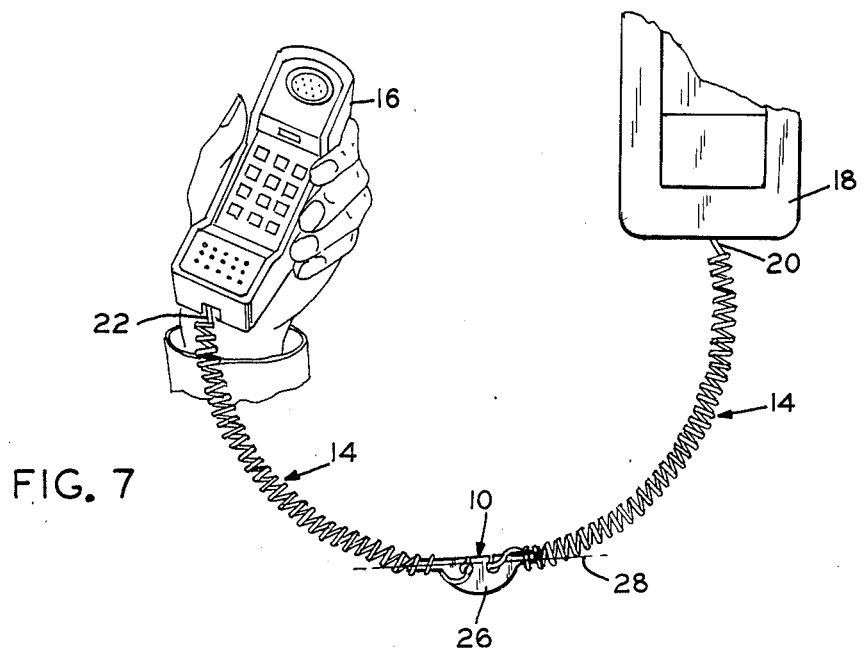
FIG. 7 illustrates the stabilizing effect of the telephone cord twist restrainer in free-hanging use.

Referring now to the drawings, and more particularly to FIG. 1, there is shown in perspective the preferred embodiment of the telephone cord twist restrainer 10 as installed on a desk- or table-type telephone 12. The telephone cord twist restrainer 10 is installed on the coiled telephone cord 14 which connects the telephone handset 16 to the telephone base 18. As can be seen, the telephone cord twist restrainer 10 is located approximately halfway between the respective ends 20 and 22 of the coiled telephone cord 14, the coiled telephone cord 14 resting in a normal position on the top surface 24 of a desk, table or other surface supporting the telephone 12.

FIG. 2 and FIG. 3 illustrate a preferred embodiment of the telephone cord twist restrainer 10. A plate 26 extends laterally from the axis 28. In the preferred embodiment, the plate 26 extends out only approximately 1¼ inches from the axis 28 as shown at 30, this amount of outward extension being found to provide effective restraint against twisting of the telephone cord without becoming a hinderance to the use of the telephone 12. A semi-circular curved outer surface 32 is utilized which extends approximately 2½ inches along the axis 28. While other shapes and sizes of plate 26 can be used, and are within the scope of the invention, such as a square or triangular plate, the indicated semicircular shape and size is preferred for the plate 26 to minimize any undesired interference caused by its use, while providing space for emergency information and advertising thereon.

In the preferred embodiment, the telephone cord twist restrainer 10 may have means for attachment to the coiled telephone cord 14 which include a pair of holes 36 and 38, through which the coiled telephone cord 14 is sequentially threaded, access being gained through slots 40 and 42, respectively. The holes 36 and 38 are of such diameter as to allow movement of the telephone cord therein; the slots 40 and 42 are of a width to permit the telephone cord to be slipped through the slots 40 and 42 into holes 36 and 38, yet retain the telephone cord 14 in the holes 36 and 38. Generally a thin flexible material is preferred in the manufacture so that slots 40 and 42 which are narrow may be used, with access gained by flexing the opposing edges 44 and 46 of the slots 40 and 42 in opposite directions, thus creating a temporary larger entrance to the holes 36 and 38.

To hold the telephone cord twist restrainer 10 within the coiled telephone cord 14, there are extended projections 48 and 50 which extend from the plate 26 in opposite directions along axis 28. When the coiled telephone cord 14 is extended or stretched out, there should remain at least a single coil about projections 48 and 50 so as to maintain the orientation of the telephone cord twist restrainer 10 with its axis 28 within the coils of the cord. Projections 48 and 50, in the preferred embodiment, thus each extend approximately 1½ inches from the plate 26 along axis 28, as illustrated, and, in use, are nestled within the coiled telephone cord 14 as shown best in FIG. 4 and FIG. 5. The width of the projections 48 and 50 is approximately 5/16 inch, which permits the desired loose fit within the conventional inside diameter of a coiled telephone cord 14. Notches 52 may be added to the projections 48 and 50 to provide recesses for the coiled telephone cord 14, especially when the coiled telephone cord 14 is extended or stretched. The specific size and shape of the notches may vary, depending on the shape and coiling of the cord involved.

FIG. 4 illustrates the installation of the coiled telephone cord 14 on the telephone cord twist restrainer 10, where the cord 14 is in a relaxed, closed state. As can be seen, the telephone cord 14 passes directly between holes 36 and 38, and then utilizes its coiling tendencies to repeatedly encircle the projections 48 and 50.

FIG. 5 illustrates the effect of the coiled telephone cord 14 being stretched or extended close to its limit, yet maintaining the desired single coil attachment on the projections 48 and 50 of the twist restrainer 10. When the coiled telephone cord 14 is stretched, it should be noted that the diameter of the coils decreases, thus bringing into use the notches 52 which may be found in projections 48 and 50.

FIG. 6 illustrates one manner in which the telephone cord twist restrainer 10 operates to stabilize the coiled telephone cord 14 and thus reduce its tendency to twist undesirably. As can be seen, the outer edge 32 of the plate 26 presses against the surface 24 and thus prevents the coiled telephone cord 14 from twisting at that point 56. The stabilizing of point 56 of the coiled telephone cord 14 against rotating or twisting extends along the coiled telephone cord 14 so as to restrain the coiled telephone cord 14 from twisting undesirably along its nearby length. This rudder-like effect is, of course, not only effective on horizontal surfaces, but also against any other surface which the plate 26 may press against.

FIG. 7 illustrates another manner in which the telephone cord twist restrainer 10 stabilizes the coiled telephone cord 14. As indicated above, the plate 26 extends well outward beyond the coils of the telephone cord 14 while the restrainer 10 itself is held to the cord 14 about axis 28. The restrainer 10 thus provides a leveraged weight outside of the axis 28, and the plate 26 tends to pull downward and thus stabilize the cord 14 against any propensity to rotate and thus become twisted. While the preferred embodiment of the telephone cord twist restrainer 10 is intentionally thin and thus light in weight, as seen in FIG. 3, it has been found that a great deal of weight, when leveraged outside of the axis 28 of the coiled telephone cord 14, is not needed to effectively stabilize a free-hanging coiled telephone cord 14 and keep it from kinking up.

Figure 8:
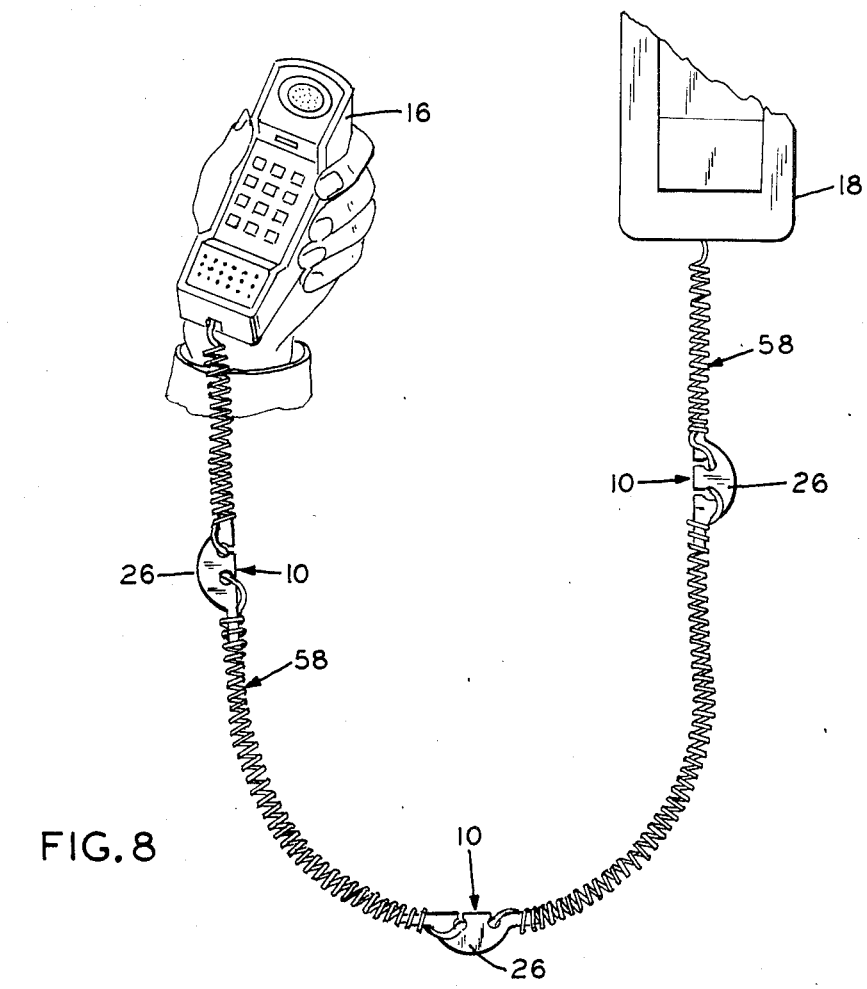
FIG. 8 illustrates the use of multiple telephone cord twist restrainers on a longer coiled telephone cord.

The above utilization of the telephone cord twist restrainer 10, as described, is the preferred embodiment when used with the normal short length of coiled telephone cord 14 between the telephone handset 16 and the telephone base 18. When longer lengths of coiled telephone cord are utilized, as shown at 58 in FIG. 8, an alternate arrangement of installation may be preferred wherein three (3) separate telephone cord twist restrainers 10 are attached to the longer cord 58, with one being attached approximately one-foot from the handset 16, the second restrainer 10 being attached to the cord 58 approximately one-foot from the telephone base 18, and the third restrainer 10 being attached to the longer cord 58 at a position approximately centered between the other restrainers 10.

It is thought that the telephone cord twist restrainer of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:

1. A telephone cord twist restrainer, used in combination with a coiled telephone cord having continuous coils and a longitudinal axis, which cord connects a telephone handset to a telephone base, the telephone cord twist restrainer comprising:
   (a) a stabilizing plate, which plate, when inserted in said coiled telephone cord, extends out from said longitudinal axis of said coiled telephone cord beyond the periphery of said continuous coils on a single side only; and
   (b) means for attaching said plate to said coiled telephone cord.

2. The telephone cord twist restrainer, as recited in claim 1, wherein said means for attaching said plate to said coiled telephone cord includes:
   two projections from said plate, which, when said plate is inserted in said coiled telephone cord, extend in opposing directions along said longitudinal axis of said coiled telephone cord, so as to be encircled by said continuous coils of said coiled telephone cord.

3. The telephone cord twist restrainer, as recited in claim 2, wherein said projections have multiple recesses formed thereon to grip said coiled telephone cord when said coiled telephone cord is extended.

4. The telephone cord twist restrainer, as recited in claim 2, wherein said means for attaching said plate to said coiled telephone cord additionally include:
   (a) two holes formed in said plate;
   (b) two slots, each of which provides a connecting opening to one of said two holes for ingress of said coiled telephone cord into said holes; and
   (c) wherein said coiled telephone cord is threaded out of one hole and directly into the other hole.

5. The telephone cord twist restrainer, as recited in claim 1, wherein said plate is approximately semi-circular in shape, and extends beyond said longitudinal axis of said coiled telephone cord approximately 1¼ inches.

6. The telephone cord twist restrainer, as recited in claim 4, wherein said holes formed in said plate are of sufficient diameter to loosely contain a single said coiled telephone cord.

7. A telephone cord twist restrainer, used in combination with a coiled telephone cord having continuous coils and a longitudinal axis, which cord connects a telephone handset to telephone base, the telephone cord twist restrainer comprising:
   (a) a stabilizing plate, which plate, when inserted in said coiled telephone cord, extends out from said longitudinal axis of said coiled telephone cord beyond the periphery of said continuous coils on a single side only; and
   (b) means for attaching said plate to said coiled telephone cord, said means including:
      two holes formed in said plate, said holes being of sufficient diameter to loosely contain a single said coiled telephone cord;

two slots, each of which provides a connecting opening to one of said two holes for ingress of said coiled telephone cord into said holes; and wherein the said coiled telephone cord is threaded out of one hole and directly into the other hole; and two projections from said plate, which, when said plate is inserted in said coiled telephone cord, extend in opposing directions along said longitudinal axis of said coiled telephone cord, so as to be encircled by said continuous coils of said coiled telephone cord;

wherein the said projections have multiple recesses formed thereon to grip said coiled telephone cord when said telephone cord is extended.

* * * * *